Sept. 13, 1960 D. C. HAUSCH 2,952,616
SEPARATION OF STABILIZED GASOLINE FROM A REFORMATE
Filed April 10, 1959
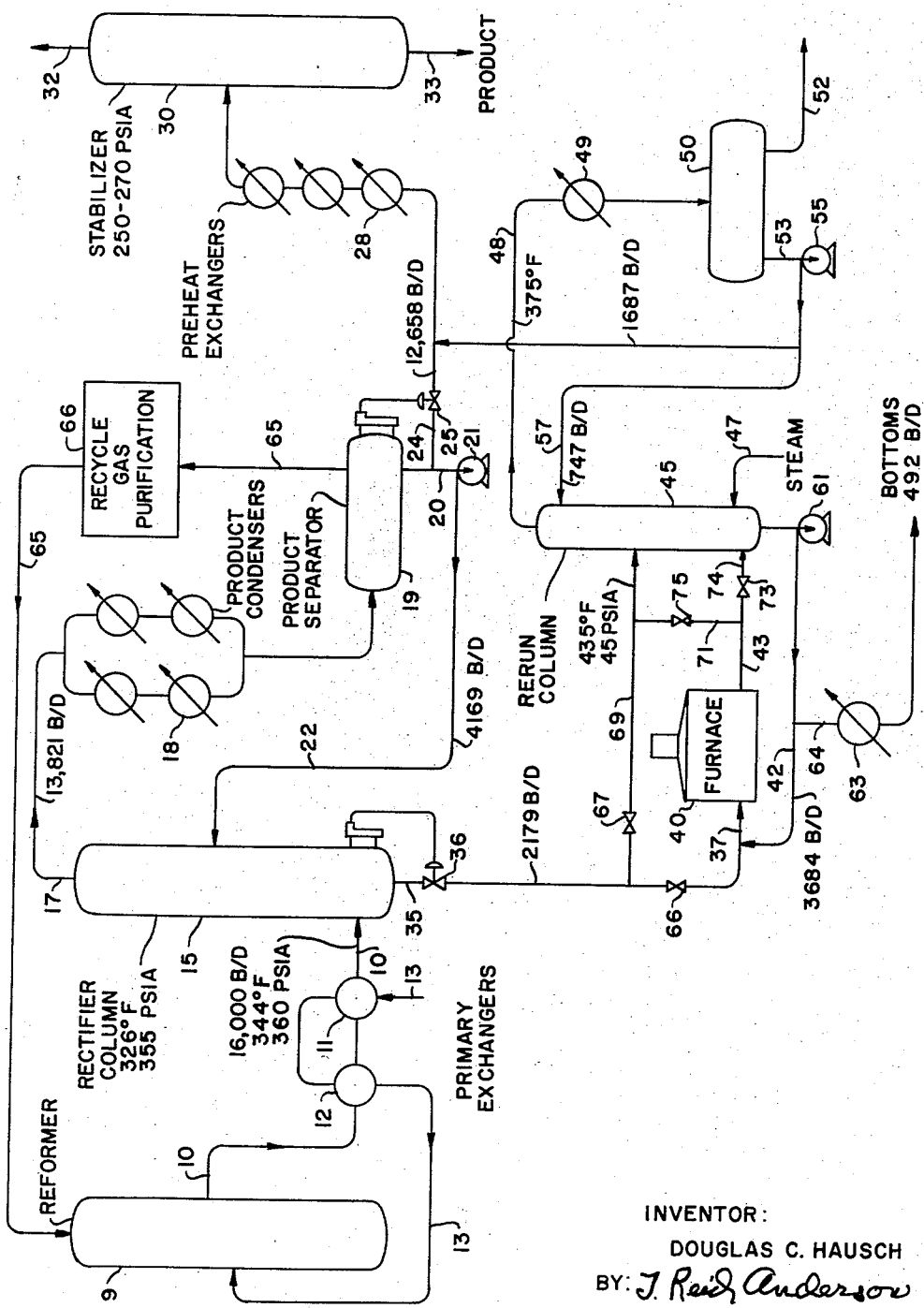
INVENTOR:
DOUGLAS C. HAUSCH
BY: J. Reid Anderson
HIS ATTORNEY

2,952,616
SEPARATION OF STABILIZED GASOLINE FROM A REFORMATE

Douglas C. Hausch, Scarsdale, N.Y., assignor to Shell Oil Company, New York, N.Y., a corporation of Delaware Filed Apr. 10, 1959, Ser. No. 805,605

4 Claims. (Cl. 208—102)

This invention relates to an improved method of reforming naphtha and separating light and heavy components from the reformed product.

The increasing demand for high octane fuel has been principally satisfied by various catalytic reforming processes. The reformates from these processes have been conventionally subjected to light ends removal comprising a partial condensation to separate overhead a recycle gas made up principally of hydrogen from a liquid stream which is subsequently heated and introduced to a stabilizer. The stabilizer may serve as a depropanizer or debutanizer with the gasoline product being removed in a bottom liquid stream and the light ends taken overhead. In order to satisfy the demand for still higher octane gasoline, the reforming processes are being operated under increasingly more severe conditions. The severe conditions have resulted in larger amounts of heavy components which must be separated from the reformate to provide a quality high octane gasoline. A conventional design for removing these heavy materials provides for the fractionation of the entire stabilized platformate stream (the liquid gasoline product) in a large column where the gasoline product is removed overhead in a gaseous stream and the objectionable heavy components separated in a much smaller bottoms liquid stream. This operation involves a considerable capital outlay for the fractionating column needed to handle the exceedingly large vapor load in addition to the high heat requirements for its operation.

It is an object of this invention to provide an improved process of reforming naphtha and separating the light and heavy components of the reformate at less expense and with reduced capital outlay. This and other objects will become more apparent from the description of the invention, made with reference in part to the drawing, in which the sole figure is a schematic representation of a preferred system for the practice of the process of the invention.

It has now beein discovered that a high octane gasoline may be produced and recovered by subjecting naphtha to a high severity catalytic reforming operation in the presence of a molar excess of hydrogen and introducing the high temperature, high pressure, essentially vaporous reformed hydrocarbon and hydrogen stream (the reformate) to a first distillation (rectifying) zone which is operated to provide a partial condensation and fractionation of the reformate to separate overhead a vapor stream comprising the vast share of the feed to the zone, leaving a small quantity of liquid bottoms which contains the obpectionably heavy components along with some gasoline. The overhead vapor stream from the foregoing first distillation zone is partially condensed to obtain a hydrogen-containing gaseous stream which may be in part recycled to the reforming process proper and a liquid gasoline-containing stream. The liquid bottoms stream from the first distillation zone is introduced to a second distillation zone (a re-run column) whence there is taken overhead a gasoline-containing vapor stream, leaving a second, more concentrated bottoms. The gasoline-containing streams from both the partial condensation and the latter distillation zone are heated and introduced to a fractionation or stabilization zone where the lighter components are removed overhead to provide a stabilized gasoline product.

In a preferred embodiment of the process a larger proportion of the second bottoms from the second distillation zone is recycled to that zone after being first admixed with the feed to the zone, i.e., the liquid bottoms stream from the first distillation zone. The combined bottoms stream is heated in a furnace before introduction to the second distillation zone. The recycling of the second bottoms and its mixing with the other bottoms stream prior to the furnace serves a most useful purpose since the recycle of the second bottoms avoids the large scale vaporization of the first bottoms (including the heavy components), that would otherwise be needed to provide sufficient heat for the fractionating requirements of the following distillation zone. A large vapor load is objectionable because it necessitates an increase in the size of equipment. By increasing the proportion of the heavy components in the furnace feed, the amount of sensible heat available in the furnace output stream is increased significantly and the degree of vaporization in the furnace is reduced.

In an alternative embodiment, the heat required for the operation of the second distillation column is supplied by heating a large portion of the second bottoms in the furnace (in the absence of the first bottoms) and returning those heated bottoms to the column.

The reformate from the catalytic reforming process, while still under essentially the pressure of the reforming zone, is heat exchanged against the feed to the process. However, the heat content of the reformate is so large that the reformed stream will still be essentially vaporous and will be at a high temperature in the range of say 325–400° F., preferably 330–350° F., and at an elevated pressure of 200–450 p.s.i.a., preferably 355–365 p.s.i.a. In the initial rectification of this high pressure, high temperature reformate, the vast shart is taken overhead and passed to product partial condensers where there occurs a drastic cooling of the vapor stream. The bottoms removed from the rectification will normally make up 10 to 15% of the reformate feed. Since the reformate bottoms will contain desirable gasoline components along with the objectionable heavy materials, the stream is introduced to a re-run column. There the gasoline separates overhead and is condensed, with a portion of the gasoline being returned as reflux and the remainder added to the gasoline-containing product from the preceding partial condensation. The combined gasoline-containing stream is then preheated and passed to a stabilization zone which may be operated as say a debutanizer or depropanizer. The heavy bottoms re-run column is operated at a lower superatmospheric pressure in the range of 25–100 p.s.i.a., for example, 45 p.s.i.a. and the stabilizer at a superatmospheric pressure lower than that of the initial rectification zone but above that in the re-run column, generally in the range of about 200–300 p.s.i.a., for example, 250–270 p.s.i.a. This elevated pressure of the stabilizer necessitates a pressurization of the gasoline liquid tops from the re-run column and for this purpose a pump is provided.

It will be seen that there are several advantages in removing the heavy component of the reformate early as proposed in the process of the present invention rather than from the stabilized product. Among other advantages, the heat remaining in the reformate after exchange with the reformer feed is utilized. Where the heavy components are removed as the bottoms from a bottoming column following product stabilization, it becomes necessary to employ a large furnace to heat and vaporize the stabilized product and to provide an excessively large column designed to handle a large vapor load. Early removal of the heavy components reduces the capital outlay and avoids the excessive heat requirements of such an operation. In one embodiment of the process of the invention the platformate bottoms from the rectification zone, since they contain inadvertently some gasoline, go to a furnace of a much smaller capacity than that required in the conventional approach and then to the re-run column. In the other embodiment of the improved process the platformate bottoms are passed directly to the re-run column and the re-run bottoms are in part heated in the small furnace and then returned to the re-run column to supply the needed heat. The re-run column has a relatively small capacity and the column employed for the initial rectification is appreciably smaller than the bottoming column of the other procedure since the former rectification column will operate at a considerably higher pressure than the latter bottoming column. Operation of the process of the invention in accordance therewith will be more readily understood by a description of the process with reference to a particular set of operating conditions, stream flows, and the like.

*Example*

Referring to the drawing, a reactor effluent (reformate) from a reformer 9 passes through a line 10 to two series-arranged primary exchangers 11 and 12 where the effluent is heat exchanged against the reformer feed carried by a line 13. The reactor effluent, flowing at the rate of 16,000 barrels per day, from the primary exchangers continues in the line 10 to the base of a rectifier column 15. The reformate enters the rectification zone at a temperature circa 344° F. and at a pressure of about 360 p.s.i.a. The rectification column is supplied with 15 trays and is operated to provide a temperature of 326° F. and a pressure of 355 p.s.i.a. at its top. Approximately 13,821 barrels per day of the rectification zone feed is removed overhead in a vapor stream via a line 17 to several water-cooled partial condensers 18. There the gasoline components of the vapor condense and are separated in a product separator 19, following the condenser, from a recycle gas made up principally of hydrogen and some lighter hydrocarbons, principally of the $C_1$–$C_4$ range. The recycled gas in the amount of approximately 156,000 pounds per hour is recycled in part to the reforming unit 9 via a line 65 and a recycle gas purification vessel 66. The product separator 19 is operated at a temperature of approximately 100° F. and under a pressure of 337 p.s.i.a. Approximately one-fourth, 4,169 barrels per day, of the liquid collecting in the separator 19 is returned as reflux via a line 20, through a pump 21 and a reflux line 22 to the top of the rectification column. The return of this portion of the condensate to the rectifying column assists in the production of a bottom product rich in heavy components. The remainder of the condensate out of the separator 19 (12,658 barrels per day) is moved in a line 24 through a metering valve 25 and a series of heat exchangers 28 to the central section of a conventional stabilizer 30. This latter vessel is generally held at a pressure in the range of 250–270 p.s.i.a. and may be operated to take $C_4$ and lighter materials overhead in a line 32, with the product gasoline being removed via a line 33.

Returning to the rectification column 15, a small quantity of liquid bottoms containing the heavier components of the reformate and inevitably some gasoline is removed by a line 35 through a flow regulator valve 36 and a line 37 and a valve 66 to a furnace 40. Valve 67 in a furnace by-pass line 69 is closed, thus directing the full bottom stream through the furnace. In the instant example, the liquid bottoms comprise 2,179 barrels per day. The heavy bottoms are mixed with a recycle of 3,684 barrels per day carried by a line 42 at a point downstream of the metering valve and preceding the furnace. The combined stream flows in the aforementioned line 37 to the furnace where it is heated to a temperature of 435° F., leaving in a line 43 and passing through a line 71 into a central section of a re-run column 45. In this embodiment of the process, valve 73 in a line 74 opening into the base of the re-run column is closed. The heated bottoms enter the column at a pressure of approximately 45 p.s.i.a. This column of 25 trays is operated with a bottoms temperature of 390° F. and a pressure of 47 p.s.i.a. and with a top pressure of 42 p.s.i.a. and a temperature of 375° F. Steam, to assist in the separation of the gasoline from the heavier components, is provided to the base of the re-run column via a line 47. Gasoline vapors and steam are removed overhead from the column in a line 48, passing to a water cooled condenser 49 where condensation of the hydrocarbons and water takes place. The condensate stratifies in an accumulator 50, following the condenser, from which the water is removed in a line 52 and the hydrocarbon in a line 53 to a pump 55. A portion, 747 barrels per day, of the hydrocarbon condensate is returned in a line 57 as reflux to the top of the re-run column and the remainder of the liquid tops passes under the force of the pump at the rate of 1,687 barrels per day via a line 59 to a juncture with the aforementioned product line 24. The combining of the two gasoline-containing streams precedes the heat exchangers 28.

A heavy bottoms, substantially free of gasoline, is removed at the rate of 4,176 barrels per day from the base of the re-run column to a pump 61. Much of the larger proportion of the gasoline-free bottoms is recycled (at a rate of 3,684 barrels per day) to the furnace, along with the heavy bottoms out of the rectification zone. The remainder of the gasoline-free heavy material passes to a cooler 63 through a line 64 and from the cooler to storage.

It may be desirable in some instances to derive the heat needed for operation of the re-run column 45 solely from the furnace heating of the re-run bottoms and to pass the first bottom stream of the rectification column 15 directly to the central section of the re-run column. This may be achieved by closing valve 66 of line 37 and opening valve 67 in the furnace by-pass line 69 to direct the first bottoms without furnace heating to the re-run column. In this embodiment of the process, the furnace effluent is returned to the bottom of the re-run column below the first tray through lines 43, 74, and open valve 73. Valve 75 in the line 71 is closed.

I claim as my invention:

1. An improved method of handling a high temperature, high pressure, essentially vaporous gasoline range, severely reformed hydrocarbon stream from a reforming zone to separate heavy and light components, including hydrogen therefrom, the steps comprising (1) introducing the high temperature reformed stream to a rectifying zone and there effecting a partial condensation and fractionation of said reformed stream to separate an overhead vapor stream comprising the vast share of said reformed stream from a small quantity of liquid bottoms containing said heavy components and some gasoline; (2) partially condensing the overhead vapor stream of step (1) to obtain a hydrogen-containing gaseous stream and a liquid gasoline-containing stream; (3) distilling the liquid bottom stream of step (1) to separate overhead a second gasoline-containing stream from a second liquids bottoms made up of the heavy components; (4) heating the gasoline-containing streams of steps (2) and (3); and (5) in a subsequent fractionation zone separating the lighter components therefrom to provide a gasoline product.

2. A process in accordance with claim 1 wherein the larger proportion of the second liquid bottoms of step (3) is recycled, being combined with the liquid bottom stream of step (1), following which the combined bottoms stream is heated and thereafter introduced to the distillation zone of step (3).

3. A process in accordance with claim 1 wherein a major portion of the second bottoms is passed to a furnace, heated, and returned to the distillation zone of step (3).

4. A process in accordance with claim 1 wherein the reformed stream is supplied to the rectifying zone at a temperature in the range of 325–400° F. and at a pressure of 200–450 p.s.i.a., and wherein the distilling of the liquid bottom stream is carried on at a pressure in the range of 25–100 p.s.i.a., and with the fractionation zone of step 5 being operated at a pressure in the range of 200–300 p.s.i.a.

References Cited in the file of this patent

UNITED STATES PATENTS

| | | |
|---|---|---|
| 2,644,785 | Harding et al. | July 7, 1953 |
| 2,736,684 | Tarnpoll | Feb. 28, 1956 |